United States Patent [19]
DiRisio

[11] Patent Number: 6,064,830
[45] Date of Patent: May 16, 2000

[54] FRAME COUNTER DISPLACEABLE TO PERMIT RETURN OF COUNTER ACTUATOR

[75] Inventor: Anthony DiRisio, Rochester, N.Y.

[73] Assignee: Eastman Kodak Company, Rochester, N.Y.

[21] Appl. No.: 09/283,740

[22] Filed: Apr. 1, 1999

[51] Int. Cl.[7] .................................................. G03B 1/66
[52] U.S. Cl. .......................................... 396/284; 396/281
[58] Field of Search .................................... 396/281, 284

[56] References Cited

U.S. PATENT DOCUMENTS

| | | | |
|---|---|---|---|
| 414,735 | 11/1889 | Taylor | 396/284 |
| 541,832 | 7/1895 | Boelte | 396/284 |
| 2,521,933 | 9/1950 | Mihalyi | 396/284 |
| 2,539,764 | 1/1951 | Wisegarver | 396/284 |
| 2,682,999 | 7/1954 | Grange | 396/284 |
| 4,653,886 | 3/1987 | Malloy-Desormeaux . | |

*Primary Examiner*—Russell Adams
*Attorney, Agent, or Firm*—Roger A. Fields

[57] ABSTRACT

A frame counter comprising a counter wheel rotatable about an axis to change a frame count, and a counter actuator supported for movement in engagement with the counter wheel to rotate the counter wheel in a predetermined direction to change the frame count, is characterized in that the counter actuator is supported to be returned each time it rotates the counter wheel in the predetermined direction to change the frame count, and the counter wheel is supported to be non-rotationally displaced with respect to its axis to permit the counter actuator to be returned without reverse rotating the counter wheel to allow the frame count to remain unchanged. Preferably, the counter actuator when returned displaces the counter wheel off its axis to avoid reverse rotating the counter wheel. An anti-backup pawl engages the counter wheel to prevent reverse rotation of said counter wheel and is resilient to urge the counter wheel towards its axis.

9 Claims, 12 Drawing Sheets

FRAME COUNTER DISPLACEABLE TO PERMIT RETURN OF COUNTER ACTUATOR

CROSS REFERENCE TO RELATED APPLICATIONS

Reference is made to commonly assigned, co-pending applications Ser. No. 09/283,422, entitled ROTATIONAL SUPPORT FOR COUNTER WHEEL FACILITATES ASSEMBLY/DISASSEMBLY OF FRAME COUNTER, and filed Apr. 8, 1999 in the name of Anthony DiRisio, and Ser. No. 09/283,422, entitled COMBINED FRAME COUNTER AND VIEWFINDER UNIT and filed Apr. 1, 1999 in the name of Anthony DiRisio.

FIELD OF THE INVENTION

The invention relates generally to the field of photography, and in particular to a frame counter for indicating how many frames are left to be exposed on a filmstrip in a camera.

BACKGROUND OF THE INVENTION

Film and cameras that are all in one, commonly referred to as single-use or one-time-use cameras, have become well known. The one-time-use camera is a simple point-and-shoot type comprising an opaque plastic main body part which supports a conventional film cartridge in a cartridge receiving chamber, an unexposed film roll prewound from the film cartridge onto a film take-up spool in a film supply chamber, a backframe opening between the cartridge receiving and film supply chambers for exposing successive frames of the filmstrip, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a counter wheel rotatable to indicate the number of exposures remaining to be made on the filmstrip, a direct see-through viewfinder having front and rear viewfinder lenses, and in some models an electronic flash. A pair of opaque plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed frame of the filmstrip into the film cartridge and moves a fresh frame of the filmstrip from the unexposed film roll to the backframe opening. The rewinding movement of the filmstrip the equivalent of slightly more than one frame width rotates the metering sprocket in engagement with the filmstrip to decrement the counter wheel to its next lower-numbered frame setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

THE CROSS-REFERENCED APPLICATION

The cross-referenced application Ser. No. 09/283,422, entitled ROTATIONAL SUPPORT FOR COUNTER WHEEL FACILITATES ASSEMBLY/DISASSEMBLY OF FRAME COUNTER, discloses a frame counter comprising a counter wheel rotatable in a count related direction to change a frame count, an anti-backup pawl for engaging the counter wheel to prevent reverse rotation of the counter wheel, and a fixed bearing constructed to support the counter wheel for rotation at a first location. The anti-backup pawl has an integral bearing constructed to support the counter wheel for rotation at a second location which is spaced from the first location, and is supported to be retracted from a ready position for engagement with the counter wheel to retract the integral bearing from the second location. This allows the counter wheel to be placed between the fixed bearing and the retracted pawl and integral bearing during assembly of the frame counter and allows the counter wheel to be removed from between the fixed bearing and the retracted pawl and integral bearing during disassembly of the frame counter.

The cross-referenced application Ser. No. 09/285,160, entitled COMBINED FRAME COUNTER AND VIEWFINDER UNIT, discloses a combined frame counter and viewfinder unit comprising a pair of front and rear viewfinder lenses, a support piece having respective spaced slots that support the front and rear viewfinder lenses parallel to one another, a counter wheel rotatable to provide a visible frame count, and a top piece that supports the counter wheel for rotation over the front and rear viewfinder lenses to hold the front and rear viewfinder lenses in the slots.

SUMMARY OF THE INVENTION

A frame counter comprising a counter wheel rotatable about an axis to change a frame count, and a counter actuator supported for movement in engagement with the counter wheel to rotate the counter wheel in a predetermined direction to change the frame count, is characterized in that:

the counter actuator is supported to be returned each time it rotates the counter wheel in the predetermined direction to change the frame count; and the counter wheel is supported to be non-rotationally displaced with respect to its axis to permit the counter actuator to be returned without reverse rotating the counter wheel, to allow the frame count to remain unchanged.

Preferably, the counter actuator when returned displaces the counter wheel off its axis to avoid reverse rotating the counter wheel. An anti-backup pawl engages the counter wheel to prevent reverse rotation of said counter wheel and is resilient to urge the counter wheel towards its axis.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Referring now to the drawings, FIGS. 1–12 show a combined frame counter and viewfinder unit 10 comprising an opaque bottom support piece 12, a pair of front and rear viewfinder lenses 14 and 16, an rigid opaque counter wheel 18, and a transparent top piece 20.

The bottom support piece 12 has an integral rigid side catch 22, a pair of front vertical slots 24, 24, a pair of rear vertical slots 26, 26, a top hole 28, and a shutter release button 30 that is manually depressible to take a picture. See FIG. 1.

The front viewfinder lens 14 has opposite vertical edges 32, 32 that fit into the front vertical slots 24, 24. The rear viewfinder lens 16 has opposite vertical edges 34, 34 that fit into the rear vertical slots 26, 26 See FIG. 1.

The counter wheel 18 has an integral center post 36 coincident with an axis of rotation 38, a circular array of peripheral teeth 40 arranged along a peripheral wheel edge 42 that is concentric about the axis, and a circular series of indicia 44 for providing a visible frame count.

As shown in FIGS. 1–6, the top piece 20 has an integral counter window 46 for viewing the indicia 44 in succession to see the current frame count. A horizontal slot 48 in the top piece 20 is positioned over a space 50 between the front and rear viewfinder lenses 32 and 34, and is configured to receive the center post 36 beginning at an underside 52 of the top piece, to allow rotation of the counter wheel 18 in a predetermined or count related direction 54, i.e. clockwise in FIGS. 1 and 2, about the axis 38, and to allow a limited translation of the counter wheel perpendicularly from the axis. An anti-backup pawl 56 is resiliently elastically supported on the top piece 20 and is adapted to engage any one of the peripheral teeth 40 to prevent reverse rotation, i.e. rotation counter-clockwise in FIGS. 1 and 2, of the counter wheel 18 about the axis 38. A fixed bearing 58 depends from the underside 52 at a first location 60 beneath the underside and adjacent successive ones of the peripheral teeth 40, and an integral bearing 62 depends from the anti-backup pawl 56 at a second location 64 beneath the underside and adjacent successive ones of the peripheral teeth, to rotatably support the counter wheel 18 with its center post 36 in the slot 48. The first and second locations 60 and 64 preferably are spaced 180° apart from one another. The anti-backup pawl 56 is resiliently elastically biased to a ready position, shown in FIGS. 2, 3, 6 and 7, for engaging any one of the peripheral teeth 40, and tends to urge the integral bearing 62 to translate the counter wheel 18 towards the fixed bearing 58. The anti-backup pawl 56 can be retracted (to the right in FIG. 3) from the ready position, for example to disengage the anti-backup pawl from engagement with any one of the peripheral teeth 40, and when retracted it retracts the integral bearing from its second location 64 to further space the integral bearing from the fixed bearing. The top piece 20 has a resiliently elastically supported hook 66 that is adapted to engage the catch 22, and a locator pin 68 that is adapted to snugly fit into the hole 28 to secure the top piece to the bottom support piece 12. See FIGS. 1–3. The counter wheel 18 is supported for rotation immediately (directly) over the front and rear viewfinder lenses 32 and 34, to be rotated in contact with the lenses. This allows the counter wheel 18 to hold the front and rear viewfinder lenses 32 and 34 edgewise in the front and rear vertical slots 24, 24 and 26, 26.

Figure 1:
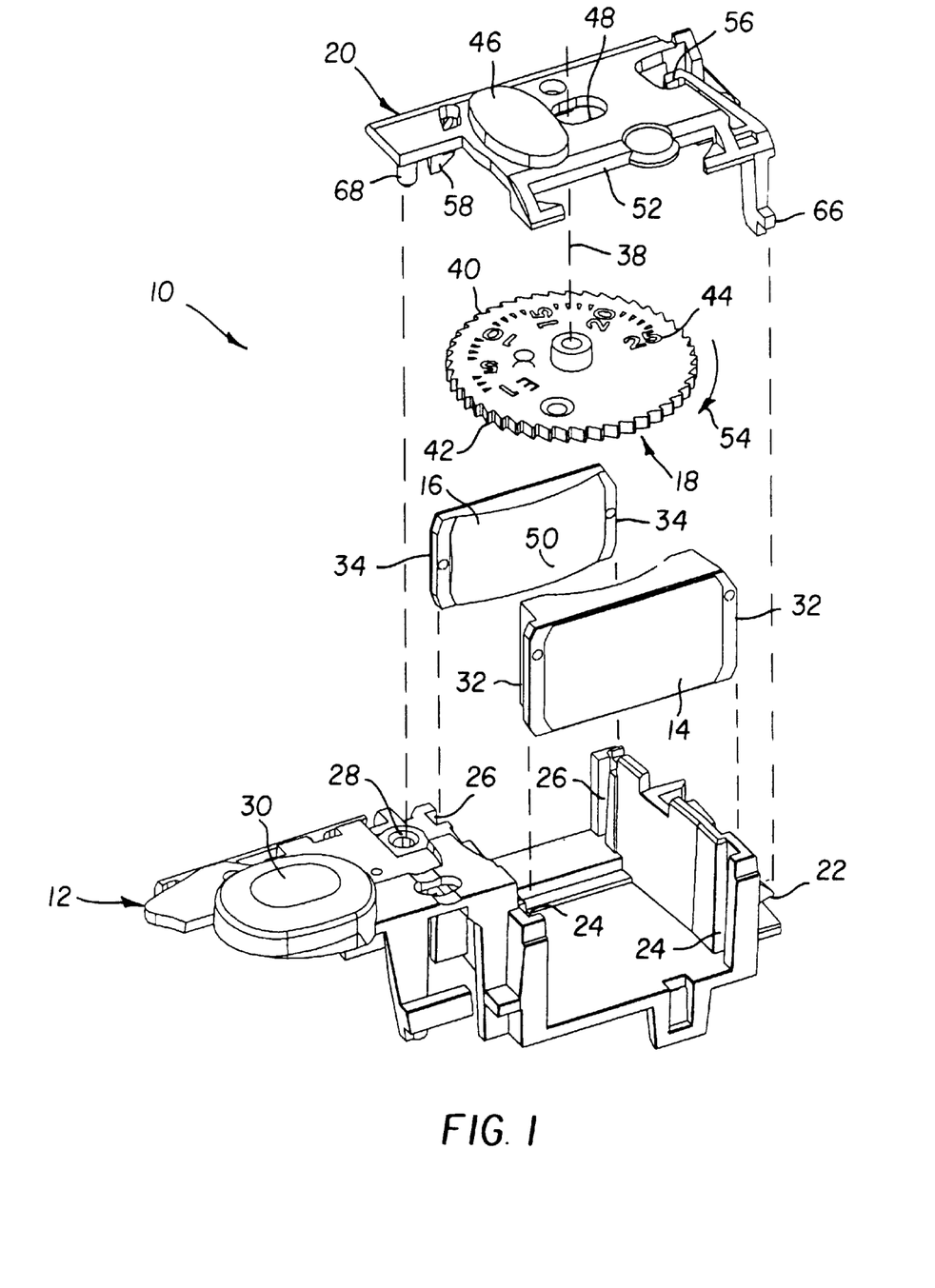
FIG. 1 is an exploded front perspective view of a combined frame counter and viewfinder unit according to a preferred embodiment of the invention.
Figure 2:
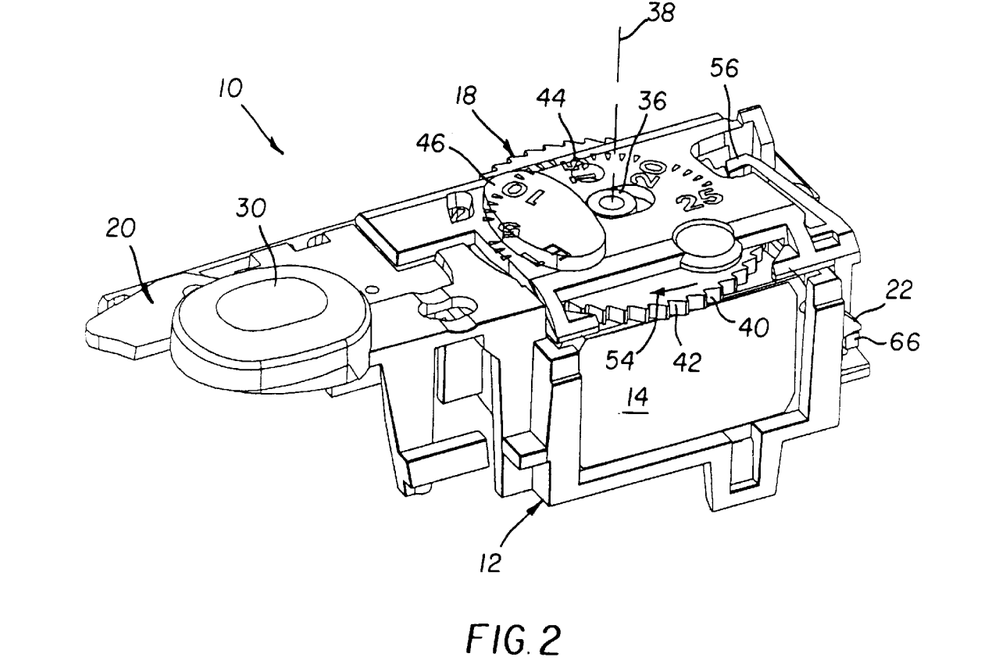
FIG. 2 is an assembled front perspective view of the combined frame counter and viewfinder unit.
Figure 3:
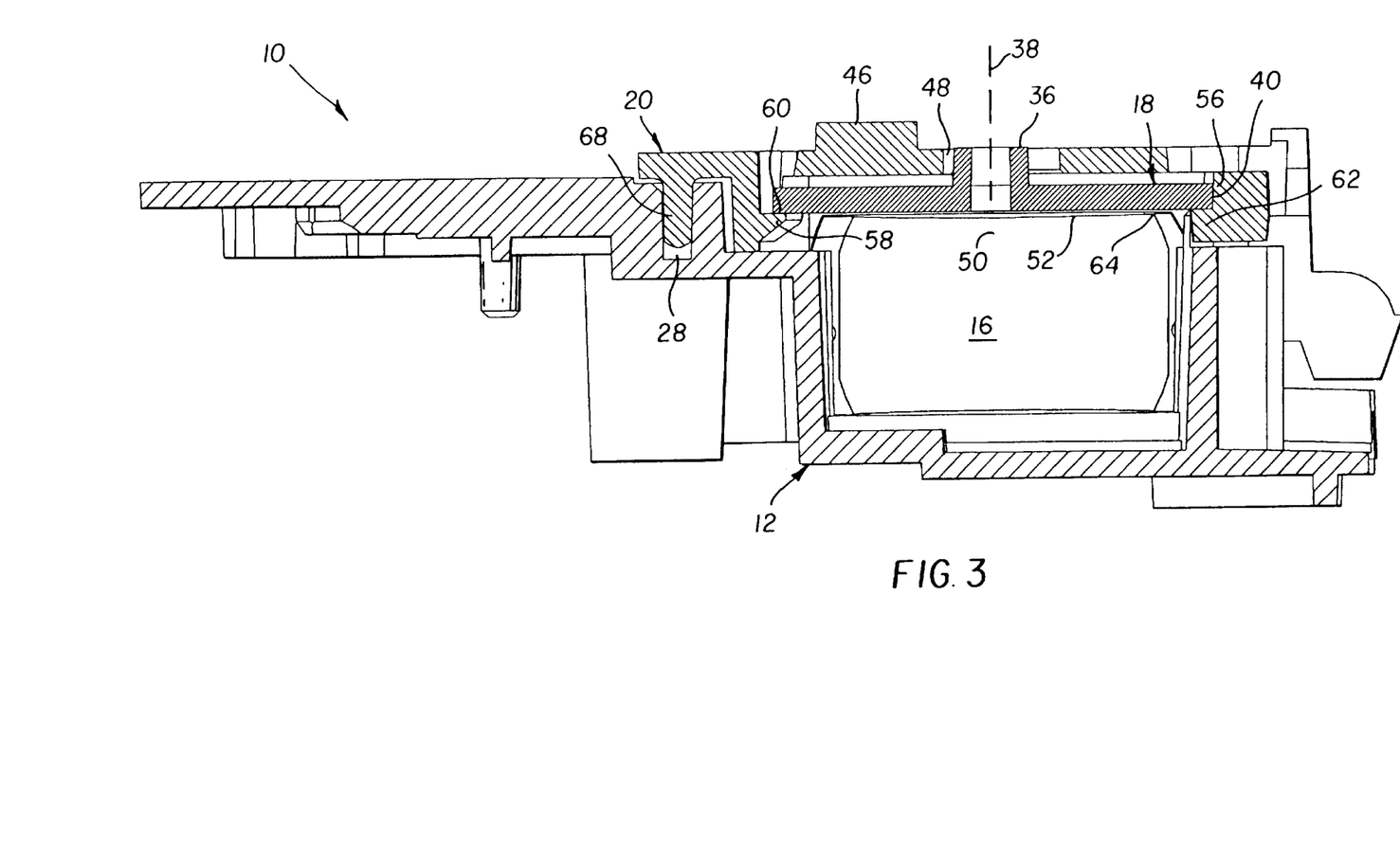
FIG. 3 is a front cross-section elevation view of the combined frame counter and viewfinder unit.
Figure 4:
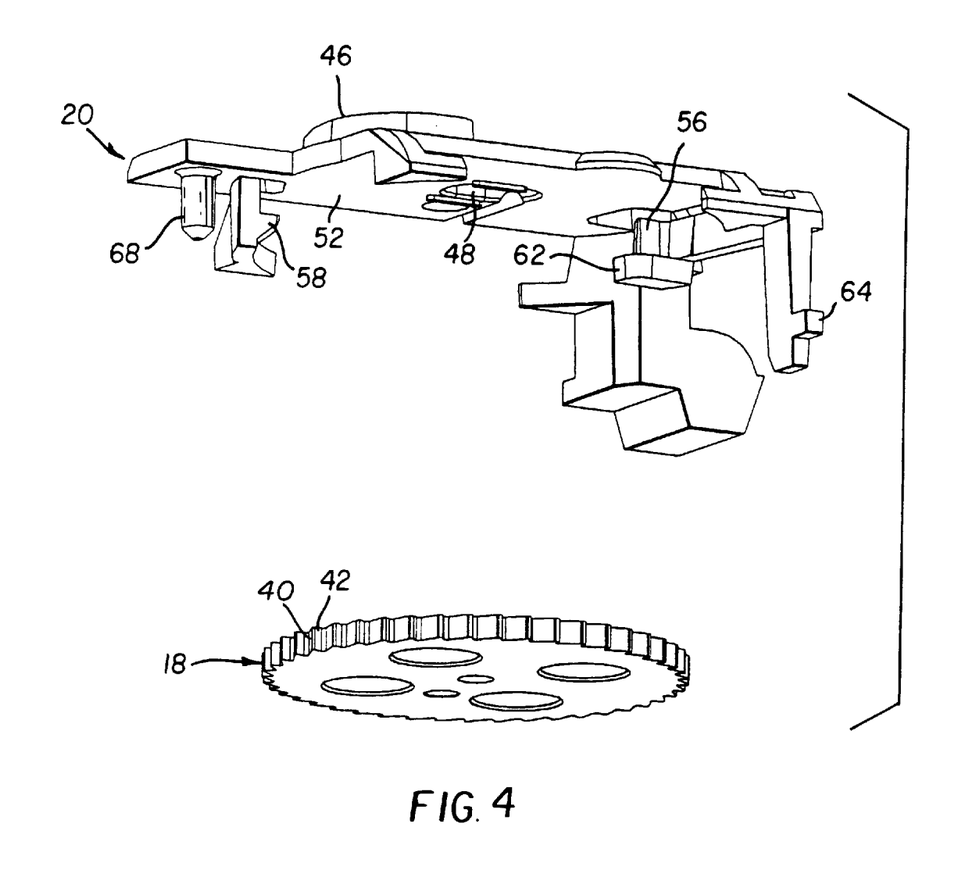
FIGS. 4, 5 and 6 are front perspective views of the frame counter depicting how it is assembled.
Figure 5:
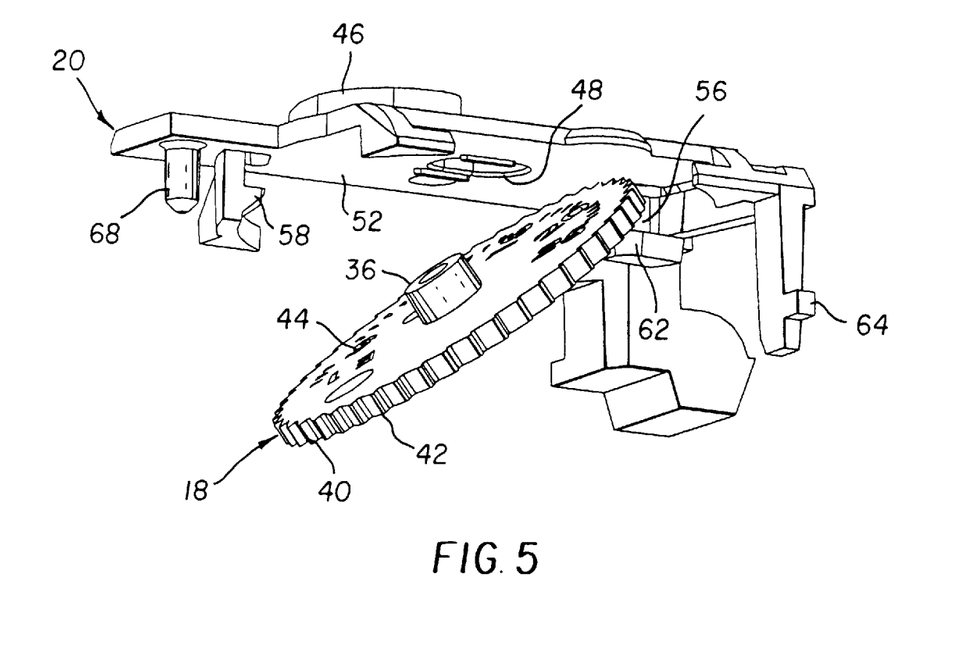
Figure 6:
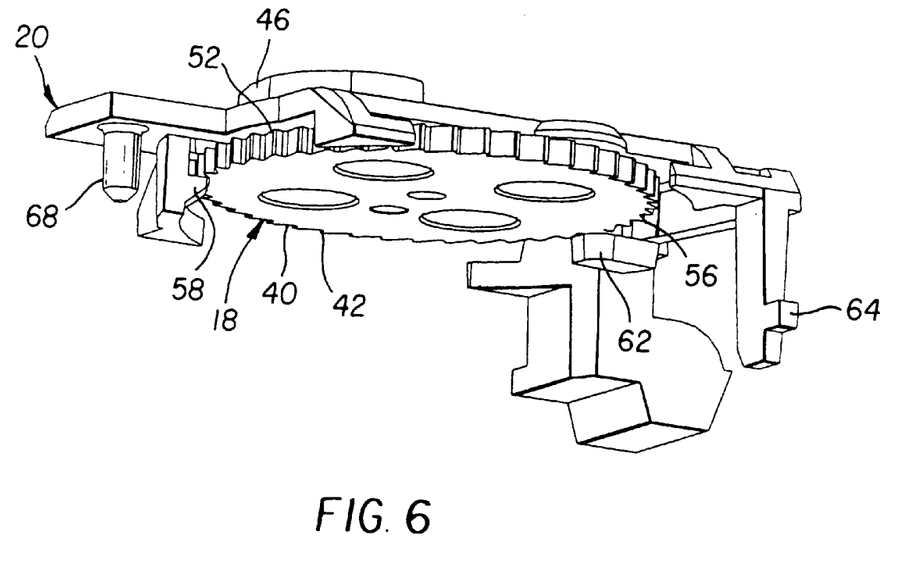

A method of assembling the combined frame counter and viewfinder unit 10 is shown in FIGS. 4–6 and comprises the following steps.

1. The front and rear viewfinder lenses 32 and 34 are inserted edge-wise into the front and rear vertical slots 24, 24 and 26, 26. See FIGS. 1 and 2.

2. As shown in FIG. 5, the peripheral wheel edge 42 is pushed at an angle against the anti-backup pawl 56 and/or the integral bearing 62 to retract the anti-backup pawl from its ready position for engaging any one of the peripheral teeth 40 and to retract the integral bearing from its second location 64 to further space the integral bearing from the fixed bearing 58. This allows the counter wheel 18 to be swung clockwise in FIG. 5 to between the fixed bearing 58 and the retracted pawl 56 and integral bearing 60, and allows the center post 36 to be inserted into the horizontal slot 48 from the underside 52 of the top piece 20.

3. The anti-backup pawl 56 returns to its ready position in engagement with any one of the peripheral teeth 40, and the integral bearing 62 returns to its second location 64 to be spaced closer to the fixed bearing 58. See FIG. 6.

Converse to the method of assembling the combined frame counter and viewfinder unit 10, the anti-backup pawl 56 can be retracted from its ready position out of engagement with any one of the peripheral teeth 40 and the integral bearing 62 can be retracted from its second location 64 to further space the integral bearing from the fixed bearing 58, in order to allow the counter wheel 18 to be removed from between the fixed bearing and the retract pawl and integral bearing.

The counter wheel 18, although rigid, can alternatively be made resilient and elastic to facilitate placing it between, or removing it from between, the fixed bearing 58 and the retracted pawl 56 and integral bearing 60.

Figure 7:
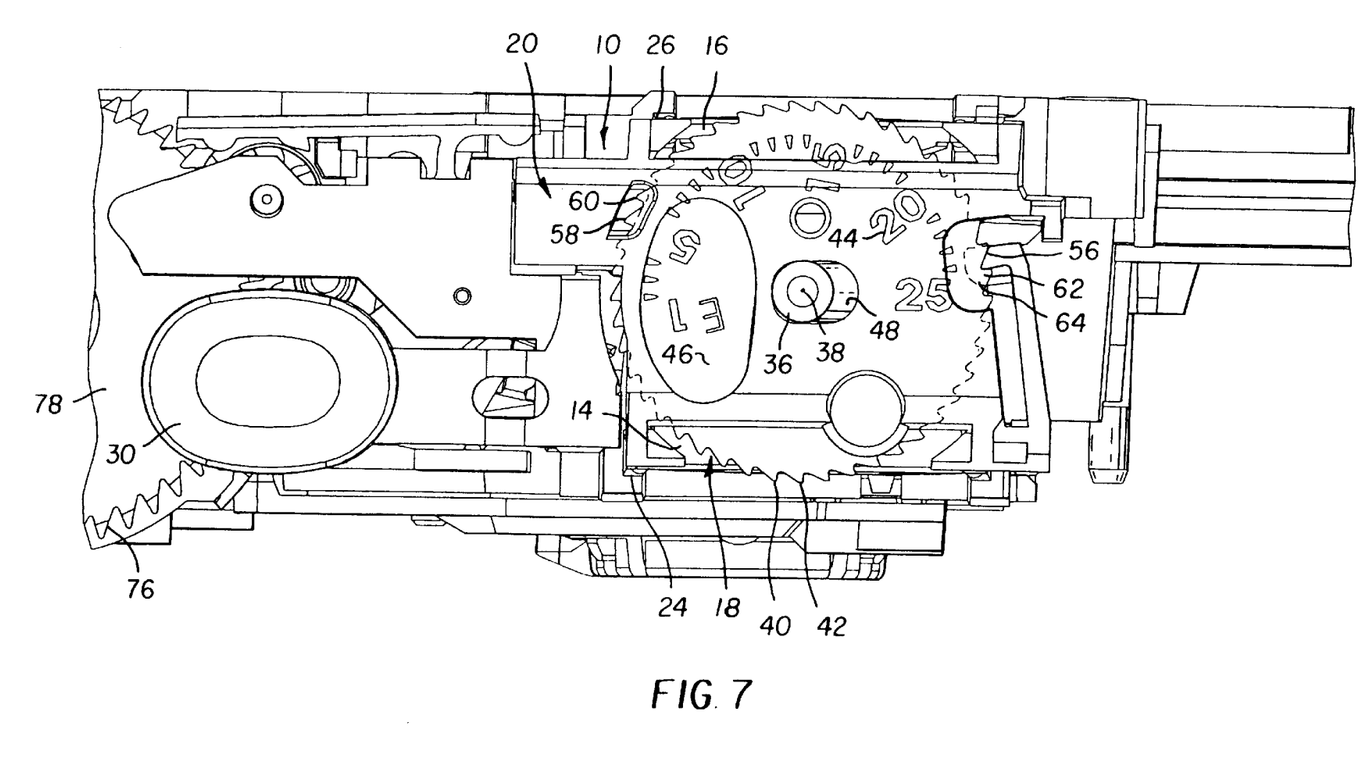
FIG. 7 is a top plan view of the combined frame counter and viewfinder unit.
Figure 8:
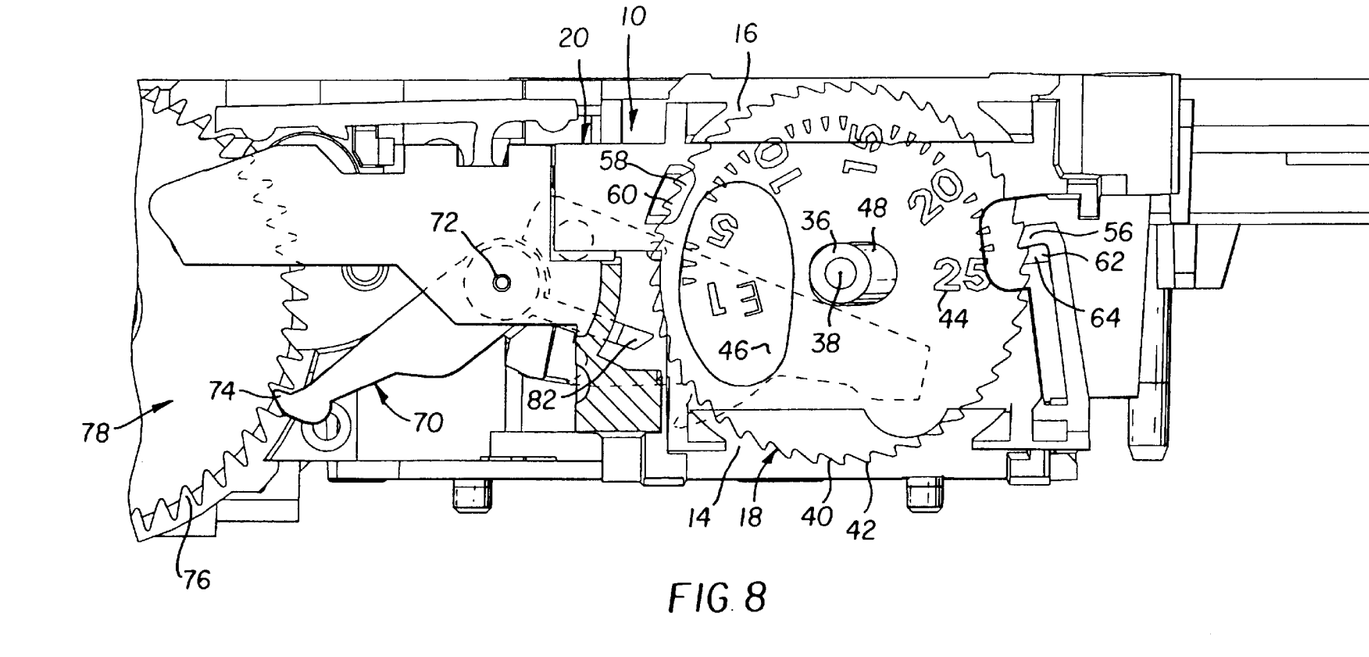
FIGS. 8, 9, 10, 11 and 12 are top plan views of the combined frame counter and viewfinder unit depicting operation of the frame counter to change the frame count.

As shown in FIGS. 7 and 8, a locking member 70 is supported for pivotal movement about a fixed pivot pin 72 on the support piece 12. The locking member 70 has a rigid thumbwheel lock or pawl 74 that engages any one of a circular array of peripheral teeth 76 on a film winding thumbwheel 78 to prevent the film winding thumbwheel from being manually rotated in a film winding direction 80. i.e. counter-clockwise in FIG. 8, and has a counter actuator 82 for engaging successive ones of the peripheral teeth 40 on the counter wheel 18 to rotate the counter wheel in the count related direction 54 about the axis 38, i.e. clockwise in FIG. 8, to change the actual frame count visible in the counter window 46. A return spring, not shown, urges the locking member 76 to pivot clockwise in FIG. 8 for the thumbwheel lock 74 to engage any one of the peripheral teeth 76 on the film winding thumbwheel 78 and for the counter actuator 82 to be held spaced from the peripheral teeth 40 on the counter wheel 18.

Figure 9:
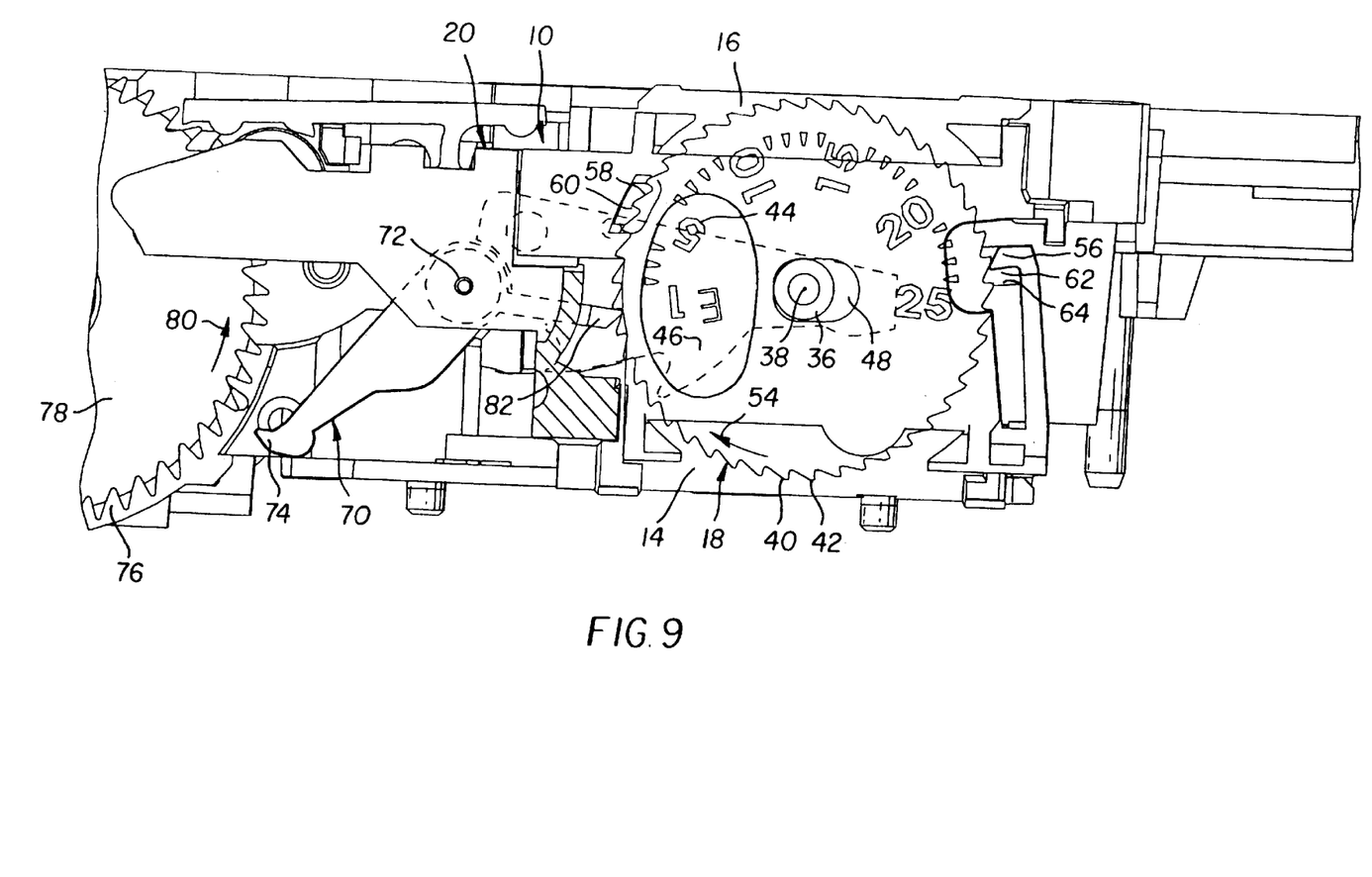
Figure 10:
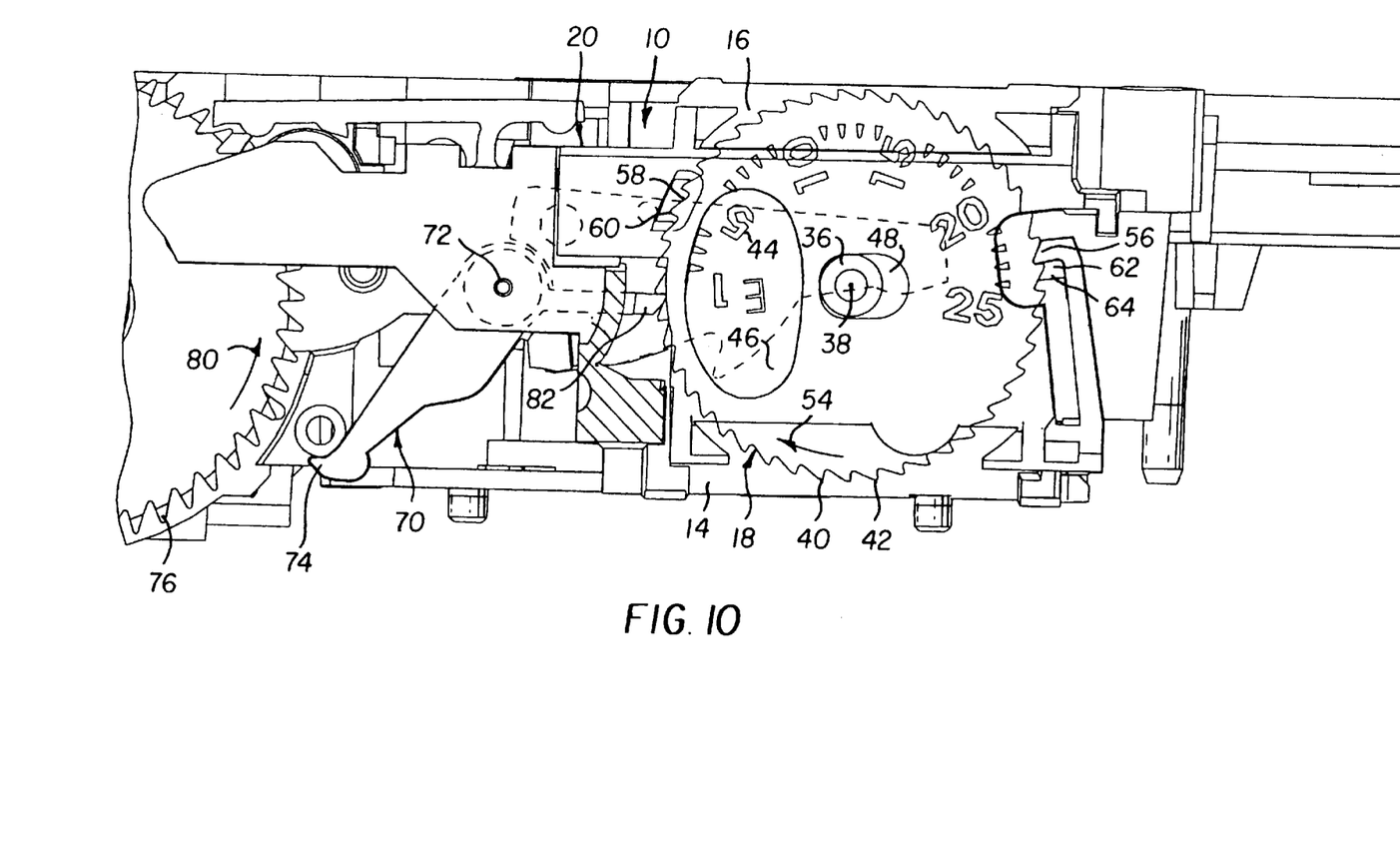

When the shutter release button 30 is manually depressed to take a picture, the locking member 70 begins to be pivoted counter-clockwise in FIGS. 9 and 10 about the pivot pin 72. This causes the thumbwheel lock 74 to disengage from any one of the peripheral teeth 76 on the film winding thumbwheel 78, to allow the film winding thumbwheel to be subsequently rotated in the film winding direction 80. After the shutter release button 30 is released from being manually depressed, the film winding thumbwheel 78 is manually rotated in the film winding direction 80. The resulting film movement causes the locking member 70 to be further pivoted counter-clockwise in FIGS. 9 and 10, which swings the counter actuator 82 into engagement with any one of the peripheral teeth 40 on the counter wheel 18. When the counter actuator 82 is moved in engagement with one of the peripheral teeth 40, the counter wheel 18 is rotated in the count related direction 54 about the axis 38, i.e. clockwise in FIGS. 9 and 10, to change the actual frame count visible in the counter window 46, i.e. to decrement the frame count by "1". As the counter wheel 18 is rotated in the counter related direction 54, the one of its peripheral teeth 40 that is engaging the anti-backup pawl 56 very slightly flexes the anti-backup pawl clockwise in FIG. 9. Then, as that tooth begins to separate from the anti-backup pawl 56, the anti-backup pawl resiliently returns counter-clockwise in FIG. 10.

Figure 11:
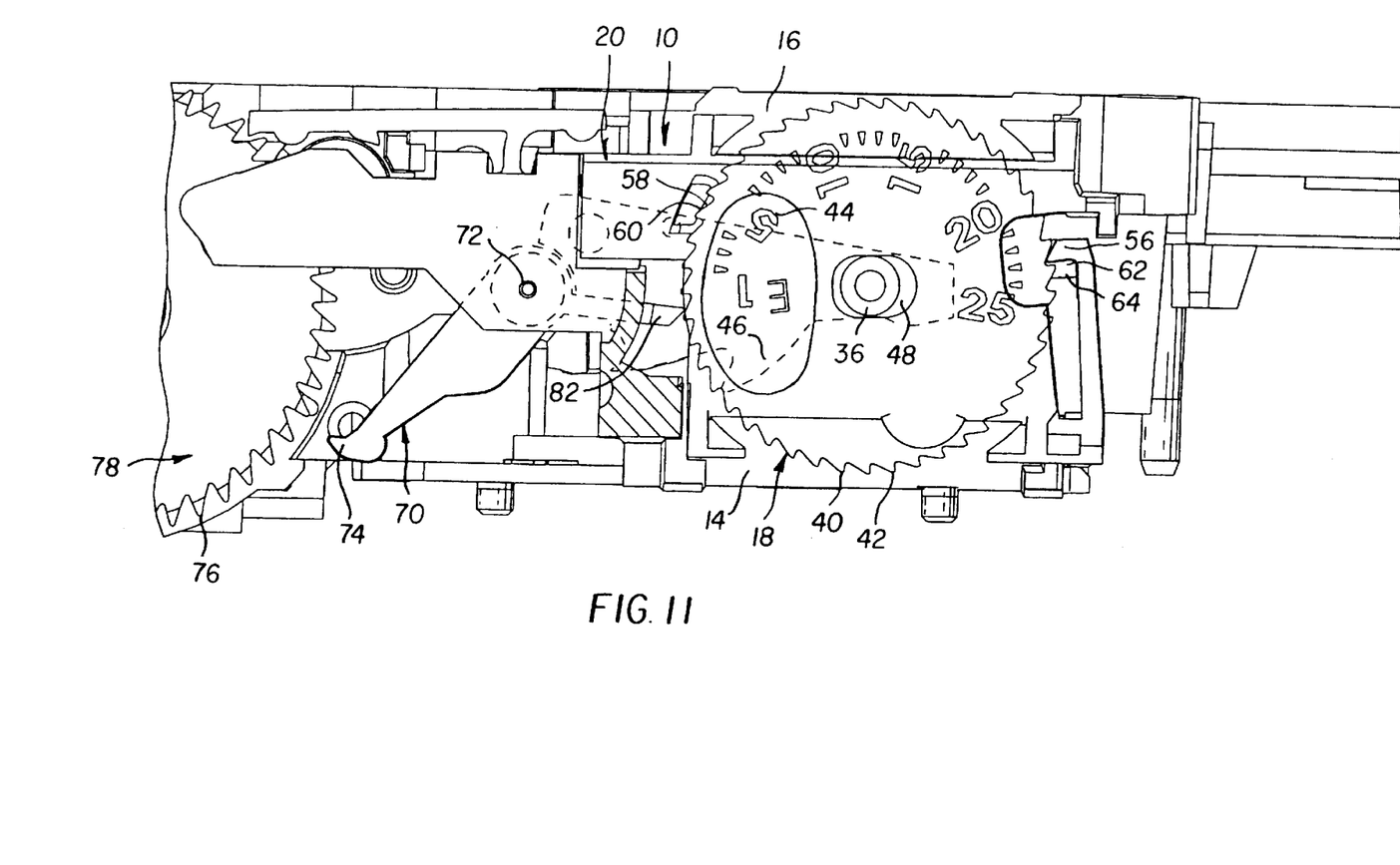

After the film winding thumbwheel 78 is manually rotated in the film winding direction 80, the return spring, not shown, begins to pivot the locking member 70 clockwise in FIG. 11 about the pivot pin 72, and the counter actuator 82 is similarly swung clockwise. This reverse movement of the counter actuator 82 causes the counter actuator to abut one of the peripheral teeth 40 on the counter wheel 18 to translate the counter wheel very slightly to the right in FIG. 11, i.e. perpendicular to the axis 38, which flexes the anti-backup pawl 56 clockwise in FIG. 11. The counter wheel 18 is not reverse rotated, i.e. rotated counter-clockwise in FIG. 11. Thus, the actual frame count visible in the counter window 46 is not now changed.

Figure 12:
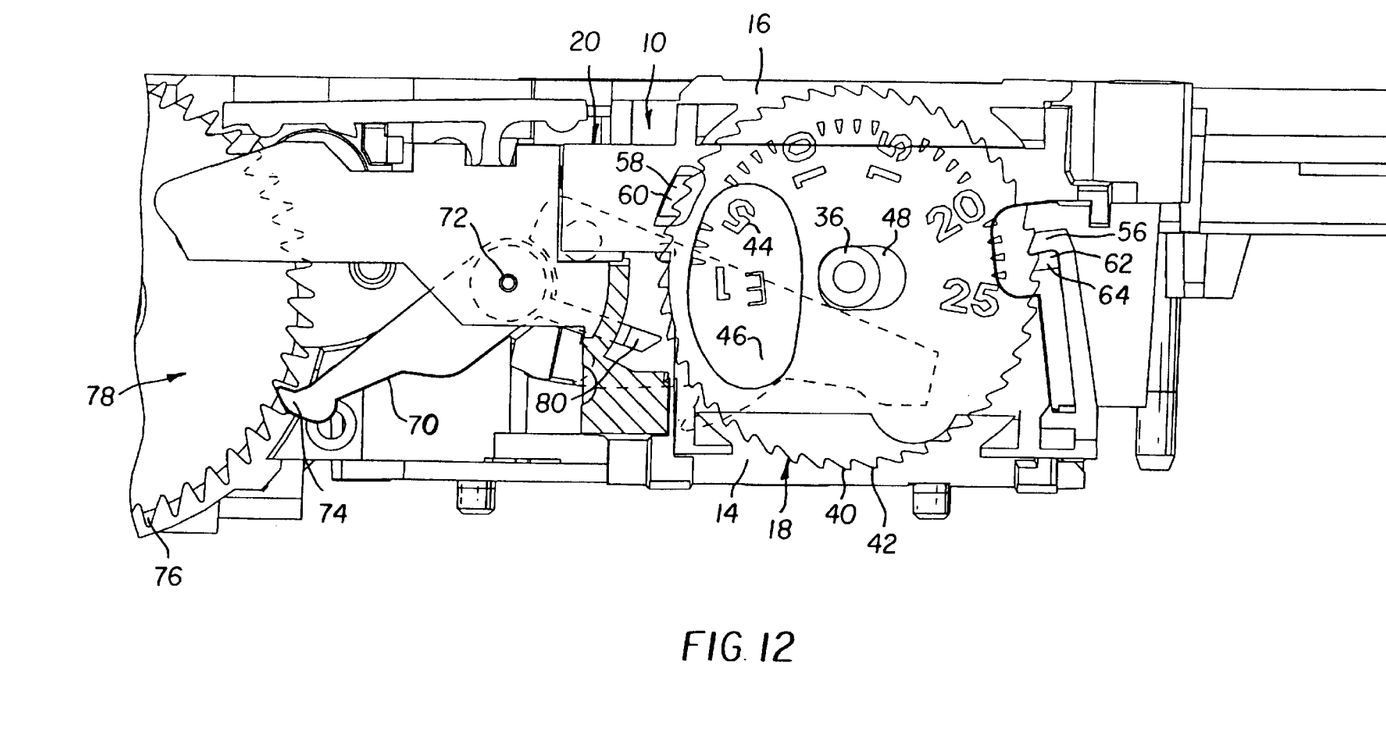

As shown in FIG. 12, the locking member 20 is further pivoted clockwise about the pivot pin 72 to re-engage any one of the peripheral teeth 76 on the film winding thumbwheel 78, and the counter actuator 82 is similarly returned clockwise to separate from any one of the peripheral teeth 40 on the counter wheel 18. Then, the anti-backup pawl 56 is resiliently returned counterclockwise in FIG. 12 to translate the counter wheel 18 very slightly to the left, i.e. perpendicular to the axis 38.

The invention has been described with reference to a preferred embodiment. However, it will be appreciated that variations and modifications can be effected by a person of ordinary skill in the art without departing from the scope of the invention.

PARTS LIST 10. combined frame counter and viewfinder unit
12. bottom support piece
14. front viewfinder lens
16. rear viewfinder lens
18. counter wheel
20. top piece
22. catch
24, 24. front vertical slots
26, 26. rear vertical slots
28. hole
30. shutter release button
32, 32. lens edges
34, 34. lens edges
36. center post
38. axis
40. peripheral teeth
42. peripheral wheel edge
44. indicia
46. counter window
48. horizontal slot
50. space
52. underside
54. predetermined or count related direction
56. anti-backup pawl
58. fixed bearing
60. first location
62. integral bearing
64. second location
66. hook
68. locator pin
70. locking member
72. pivot pin
74. thumbwheel lock
76. peripheral teeth
78. film winding thumbwheel
80. film winding direction
82. counter actuator

What is claimed is:

1. A frame counter comprising a counter wheel rotatable about an axis to change a frame count, and a counter actuator supported for movement in engagement with said counter wheel to rotate said counter wheel in a predetermined direction to change the frame count, is characterized in that:

said counter actuator is supported to be returned each time it rotates said counter wheel in the predetermined direction to change the frame count; and said counter wheel is supported to be non-rotationally displaced with respect to its axis to permit said counter actuator to be returned without reverse rotating said counter wheel, to allow the frame count to remain unchanged.

2. A frame counter as recited in claim 1, wherein said counter actuator when returned displaces said counter wheel off its axis to avoid reverse rotating said counter wheel.

3. A frame counter as recited in claim 1, wherein said counter wheel is supported to be displaced perpendicular to its axis.

4. A frame counter as recited in claim 1, wherein said counter wheel has a center post coincident with the axis, and a support slot contains said center post to permit rotation of said counter wheel about its axis and to permit translation of said counter wheel to displace said counter wheel with respect to its axis.

5. A frame counter as recited in claim 1, wherein an anti-backup pawl engages said counter wheel to prevent reverse rotation of said counter wheel and is elastic to permit said counter wheel to be displaced with respect to its axis without said anti-backup pawl becoming disengaged from said counter wheel.

6. A frame counter as recited in claim 1, wherein said counter wheel has peripheral teeth, said counter actuator engages any one of said peripheral teeth to rotate said counter wheel in the predetermined direction and displaces said counter wheel when in engagement with one of said peripheral teeth to permit said counter actuator to be returned, and an anti-backup pawl engages any one of said peripheral teeth to prevent reverse rotation of said counter wheel and is elastic to permit said counter wheel to be displaced.

7. A frame counter comprising a counter wheel rotatable to change a frame count, and a counter actuator supported for movement in engagement with said counter wheel to rotate said counter wheel in a predetermined direction to change the frame count, is characterized in that:

said counter actuator is supported to be returned each time it rotates said counter wheel in the predetermined direction, without reverse rotating said counter wheel, to allow the frame count to remain unchanged.

8. A frame counter comprising a counter wheel rotatable about an axis to change a frame count and having a circular array of teeth concentric about the axis, and a counter actuator supported for movement in engagement with any one of said teeth to rotate said counter wheel in a predetermined direction to change the frame count, is characterized in that:

said counter actuator is supported to be pivoted in engagement with any one of said teeth to rotate said counter wheel in the predetermined direction to change the frame count and is supported to be returned each time it is pivoted; and said counter wheel is supported to be moved off its axis to permit said counter actuator to disengage from any one of said peripheral teeth to be returned without reverse rotating said counter wheel, to allow the frame count to remain unchanged.

9. A frame counter as recited in claim 8, wherein an anti-backup pawl engages any one of said teeth to prevent reverse rotation of said counter wheel and is resilient to urge said counter wheel towards its axis.

* * * * *